US011686860B2

(12) United States Patent
Yu

(10) Patent No.: US 11,686,860 B2
(45) Date of Patent: Jun. 27, 2023

(54) METHOD FOR QUICKLY ACQUIRING HIGHLY RELIABLE INTEGER SOLUTION FOR SATELLITE POSITIONING

(71) Applicant: SOUTHEAST UNIVERSITY, Jiangsu (CN)

(72) Inventor: Xianwen Yu, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 311 days.

(21) Appl. No.: 17/233,555

(22) Filed: Apr. 19, 2021

(65) Prior Publication Data

US 2021/0239852 A1 Aug. 5, 2021

Related U.S. Application Data

(63) Continuation-in-part of application No. PCT/CN2019/109484, filed on Sep. 30, 2019.

(30) Foreign Application Priority Data

Apr. 30, 2019 (CN) ......................... 201910365989.9

(51) Int. Cl.
*G01S 19/44* (2010.01)

(52) U.S. Cl.
CPC .................................... *G01S 19/44* (2013.01)

(58) Field of Classification Search
CPC ...................................................... G01S 19/44
See application file for complete search history.

(56) References Cited

U.S. PATENT DOCUMENTS

2011/0140959 A1* 6/2011 Vollath .................... G01S 19/44
342/357.27
2018/0299562 A1 10/2018 Green
2021/0072406 A1* 3/2021 Chen ....................... G01S 19/44

FOREIGN PATENT DOCUMENTS

CN 103487821 1/2014
CN 107390250 11/2017
(Continued)

OTHER PUBLICATIONS

"International Search Report (Form PCT/ISA/210) of PCT/JP2019/109484", dated Jan. 31, 2020, with English translation thereof, pp. 1-5.

*Primary Examiner* — Bernarr E Gregory
*Assistant Examiner* — Fred H Mull
(74) *Attorney, Agent, or Firm* — JCIPRNET

(57) ABSTRACT

The present disclosure discloses a method for quickly acquiring a highly reliable integer solution for satellite positioning. The method includes: acquiring observation data by a data computing platform from a GNSS receiver; establishing a GNSS carrier observation equation; solving a real solution for ambiguity and the corresponding variance matrix, a real solution for other unknown parameters including positioning parameters and the corresponding variance matrix, and a covariance matrix of the and by using the least squares method; determining integer vectors with the same dimension as the ambiguity according to a given reliability probability; computing a posterior weighted probability with the integer vectors being the true value of the ambiguity; computing an integer solution for other unknown parameters including positioning parameters by using the posterior weighted probability; computing a variance matrix of the integer solution for other unknown parameters; and outputting a computed result by the data computing platform.

5 Claims, 2 Drawing Sheets

Establishing a GNSS carrier observation equation, and solving real solutions for parameters and the corresponding variance matrix and covariance matrix

↓

Determining $t$ integer vectors with the same dimension as the ambiguity according to a given reliability probability $p$

↓

Computing a posterior weighted probability with the integer vectors being the true value of the ambiguity

↓

Computing an integer solution for other unknown parameters including positioning parameters by using the posterior weighted probability

↓

Computing a variance matrix of the integer solution for other unknown parameters

(56) References Cited

FOREIGN PATENT DOCUMENTS

| | | | | | |
|---|---|---|---|---|---|
| CN | 108037521 | | | 5/2018 | |
| CN | 108802782 | | | 11/2018 | |
| CN | 110109166 | | | 8/2019 | |
| CN | 110109166 | A | * | 8/2019 | ............. G01S 19/44 |
| CN | 110445254 | A | * | 11/2019 | ............. G01S 19/42 |

* cited by examiner

METHOD FOR QUICKLY ACQUIRING HIGHLY RELIABLE INTEGER SOLUTION FOR SATELLITE POSITIONING

CROSS-REFERENCE TO RELATED APPLICATION

This application is a continuation in part of international PCT application serial no. PCT/CN2019/109484, filed on Sep. 30, 2019, which claims the priority benefit of China application no. 201910365989.9, filed on Apr. 30, 2019. The entirety of each of the above-mentioned patent applications is hereby incorporated by reference herein and made a part of this specification.

BACKGROUND

Technical Field

The present disclosure relates to the technical field of satellite positioning, in particular to a method for quickly acquiring a highly reliable integer solution for satellite positioning.

Description of Related Art

Carrier is a necessary observation for GNSS precision positioning. The carrier observation needs to add an unknown integer multiple of the carrier wavelength to be equal to the distance between a satellite and the earth, the unknown integer is known as ambiguity. With the ambiguity and other parameters including positioning parameters as unknowns, a carrier observation equation is established; and the estimates of the ambiguity and other unknown parameters and the corresponding covariance matrix can be solved based on the principle of least squares.

Since the above solving process is performed in a real number field without taking into account the integer property of the ambiguity, the resulting solutions for the ambiguity and other unknowns are called real solutions, also known as float solutions. In order to acquire solutions with better accuracy, it is necessary to use the integer property of the ambiguity to acquire integer solutions for the ambiguity and other unknowns based on real solutions.

The existing process of solving an integer solution from a real solution is as follows: (1) finding an integer vector as a candidate integer solution for the ambiguity based on the real solution for the ambiguity and the corresponding variance matrix; (2) checking the candidate integer solution by a method; and (3) solving the integer solution for other unknown parameters from the integer solution for the ambiguity based on conditional distribution if checked; otherwise, maintaining the real solution.

The above method for computing the integer solution for precise satellite carrier positioning has the following shortcomings: (1) a long initialization time is required to fix ambiguity of whole cycles; during this period, the solution for unknowns is not constrained by the condition that the true value of the ambiguity is an integer. (2) Numerous methods are available for checking; and different judgment results may be obtained from the same data by different checking methods. (3) In case of successful verification test, the integer solution appears to be obtained, but there is a risk of falsification in fact which causes unreliable positioning results. (4) There is a conflict between shortening initialization time and ensuring the reliability of positioning results.

With the popularization of satellite positioning technology, there is an urgent need for a computer-friendly and theoretically rigorous method for computing integer solutions to achieve fast, reliable and high-precision positioning by using the satellite positioning technology.

SUMMARY

To solve the defects in the prior art, the purpose of the present disclosure is to provide a method for quickly acquiring a highly reliable integer solution for satellite positioning, so as to achieve fast, reliable and high-precision positioning by using satellite positioning technology.

The purpose is achieved by the following technical solution:

A method for quickly acquiring a highly reliable integer solution for satellite positioning, wherein estimates and a variance matrix of satellite positioning parameters under the constraint of the integer property of ambiguity are obtained by synthesizing a plurality of integer vectors with the same dimension as the ambiguity according to a probability, wherein the method specifically comprises the following steps:

step 1. acquiring observation data by an input unit of a data computing platform from a GNSS receiver, and sending the observation data to a processor of the data computing platform for solving, and executing the following steps by the processor:

(1) establishing a GNSS carrier observation equation, solving a real solution $\hat{a}$ for ambiguity a and the corresponding variance matrix $D_{\hat{a}\hat{a}}$, a real solution $\hat{b}$ for other unknown parameters b including positioning parameters and the corresponding variance matrix $D_{\hat{b}\hat{b}}$, and a covariance matrix $D_{\hat{a}\hat{b}}$ of the real solutions $\hat{a}$ and $\hat{b}$ by using the least squares method;

(2) determining t integer vectors $z_t$ with the same dimension as the ambiguity according to a given reliability probability P, i=1, 2, L, t;

(3) computing a posterior weighted probability $P_i(\hat{a})$ with the t integer vectors being the true value of the ambiguity;

(4) computing an integer solution $\overline{b}_p$ for other unknown parameters b by using the posterior weighted probability; and (5) computing a variance matrix $D_{\overline{b}_p\overline{b}_p}$ of the integer solution $\overline{b}_p$; and step 2. outputting a computed result of the processor by an output unit of the data computing platform.

Further, the given reliability probability p in the step 1 is given based on reliability requirements for positioning results, generally $0.95 \leq p < 1$.

Further, the method for determining t integer vectors $z_t$ with the same dimension as the ambiguity in the step 1 comprises the following steps:

(1) computing a chi-square value $\varphi_{1-p}{}^2(n)$ according to an ambiguity dimension n and the reliability probability p;

(2) computing the hyperellipsoid radius comprising at least two integer vectors by a formula (1) according to the ambiguity dimension n:

$$\chi_{(2)}^2(n) = \frac{1}{\pi\sqrt[n]{|D_{\hat{a}\hat{a}}|}}\left[3\Gamma\left(\frac{n}{2}+1\right)\right]^{\frac{2}{n}} \quad (1)$$

in the formula (1), ‖ is a determinant compute sign and Γ(g) is a gamma function;

(3) determining the hyperellipsoid size for search by a formula (2):

$$\chi^2(n)=\max(\chi_{1-p}{}^2(n),\chi_{(2)}{}^2(n)) \quad (2);\ \text{and}$$

(4) acquiring t n-dimensional integer vectors $z_t$ by searching and comparing within the restriction of $\|\hat{a}-z_i\|D_{\hat{a}\hat{a}}{}^2\le\chi^2(n)$, i=1, 2, L, t.

Further, the computing a posterior weighted probability $P_i(\hat{a})$ with the t integer vectors being the true value of the ambiguity in the step 1 is obtained by formulas (3) and (4):

$$T_i=\exp\left(-\frac{1}{2}\|\hat{a}-z_i\|^2_{D_{\hat{a}\hat{a}}}\right)\quad i=1,2,L,t \tag{3}$$

$$P_i(\hat{a})=\frac{T_i}{\sum_{j=1}^{i}T_j} \tag{4}$$

Further, the computing an integer solution $\bar{b}_p$ for other unknown parameters b by using the posterior weighted probability in 4) of the step 1 is obtained by a formula (5):

$$\bar{b}_p=\hat{b}-D_{\hat{b}\hat{a}}D^{-1}_{\hat{a}\hat{a}}\left(\hat{a}-\sum_{i=1}^{t}P_i(\hat{a})z_i\right) \tag{5}$$

where, $D_{\hat{b}\hat{a}}=D_{\hat{a}\hat{b}}{}^T$.

Further, the computing a variance matrix $D_{\bar{b}_p\bar{b}_p}$ of the integer solution $\bar{b}_p$ in (5) of the step 1 is obtained by formulas (6), (7) and (8):

$$\frac{\partial P_i(\hat{a})}{\partial\hat{a}^T}=\frac{z_i^T\sum_{j=1}^{t}T_j-\sum_{j=1}^{t}T_jz_j^T}{\left[\sum_{j=1}^{t}T_j\right]^2}T_iD^{-1}_{\hat{a}\hat{a}}\quad j=1,2,L,t \tag{6}$$

$$K=-D_{\hat{b}\hat{a}}D^{-1}_{\hat{a}\hat{a}}\left(E-\sum_{i=1}^{t}z_i\frac{\partial P_i(\hat{a})}{\partial\hat{a}^T}\right) \tag{7}$$

$$D_{\bar{b}_p\bar{b}_p}=KD_{\hat{a}\hat{a}}K^T+D_{\hat{b}\hat{a}}K^T+KD_{\hat{a}\hat{b}}+D_{\hat{b}\hat{b}} \tag{8}$$

Advantageous Effects

The method for quickly acquiring a highly reliable integer solution for satellite positioning breaks through the existing computing mode of "determining ambiguity as an integer only". According to the method, a finite number of integer vectors are determined by a given high-reliability probability value, a probability with the integer vectors being the true value of the ambiguity is computed, and an integer solution for positioning and the corresponding variance matrix are obtained by synthesizing the integer vectors according to a probability.

The method has good advantageous effects: (1) only a few epochs are needed to solve unknown full probability integer solutions; (2) it is not needed to identify the ambiguity of whole cycles, thus keeping off the trouble of inexact identification criteria; (3) the resulting integer solutions are highly reliable; and (4) the method is applicable to multiple satellites and multiple frequencies, with simple solving process and unified algorithm.

DESCRIPTION OF THE EMBODIMENTS

Figure 1:
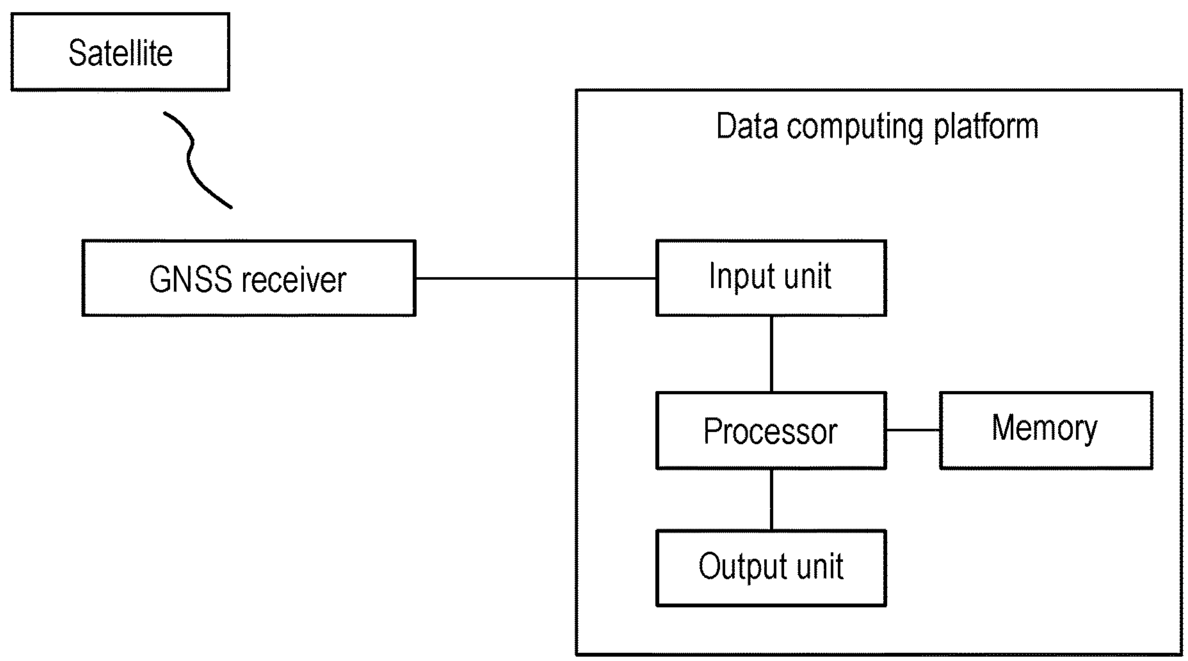
FIG. 1 is a system block diagram of a method for quickly acquiring a highly reliable integer solution for satellite positioning.
Figure 2:
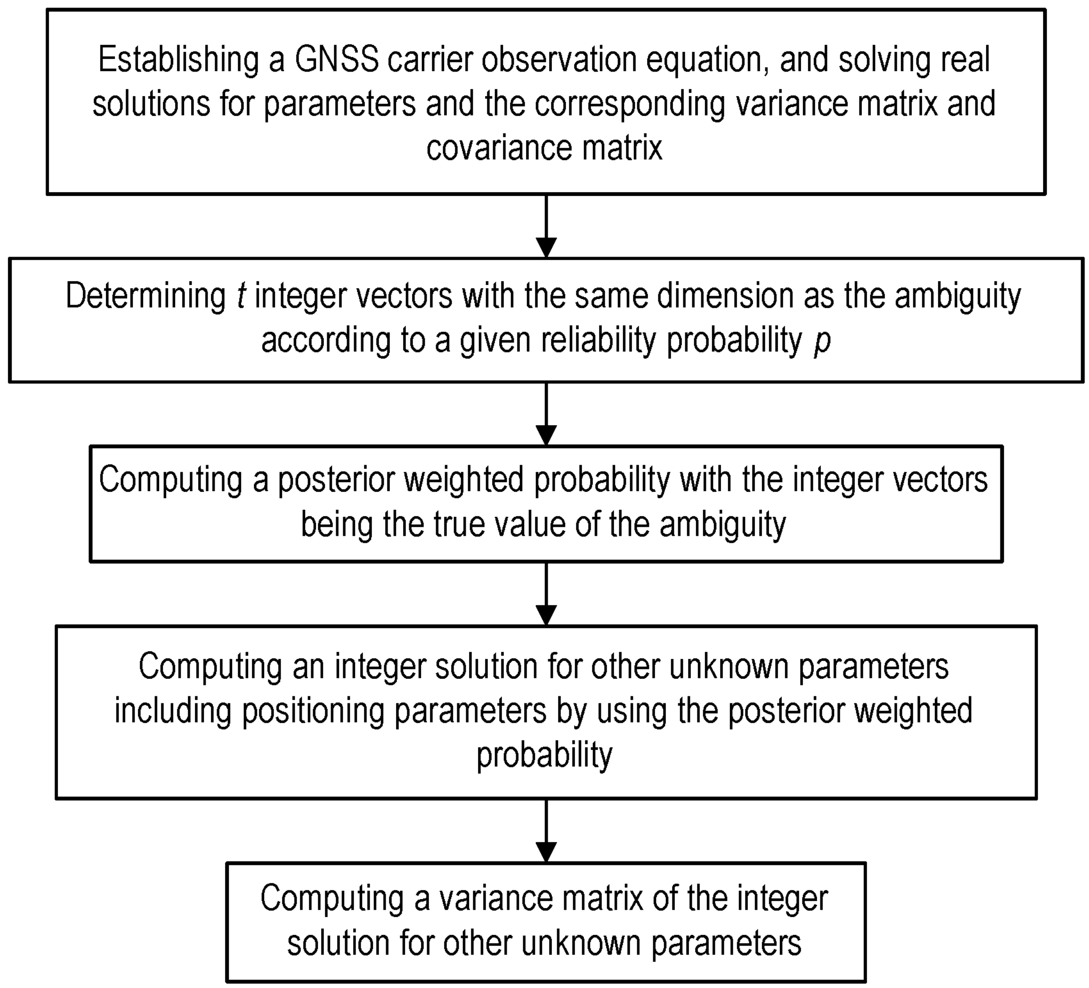
FIG. 2 is a technical flow chart for implementing the solving method in step 1 of the present disclosure.

The present disclosure will be further described with reference to the accompanying drawings.

Data in the embodiment are taken from two consecutive observation stations approximately 18 km apart in Nanjing. Observation instruments in the observation stations include Leica GPS receivers and choke ring antennae. The observation epoch interval is set to 1 s and the elevation mask angle is set to 15°.

Step 1. acquiring observation data by a computer input unit from a Leica GPS receiver through a data transmission line, and sending the observation data to a computer processor for solving, and executing the following steps by the processor:

(1) establishing a carrier observation equation, and solving real solutions for ambiguity a and other unknown parameters b and the corresponding variance matrix and covariance matrix by using the least squares method:

$$\hat{a}=(113.774002783\ 106.941104245\ 122.642171765\ 111.095951045\ 123.947487435\ 112.885194093)^T$$

$$\hat{b}=(-496.8076\ 10167.1846-14650.3774)^T$$

$$D_{\hat{a}\hat{a}}=\begin{pmatrix}5.8451870797 & 4.7615884152 & 3.8785096512 & 2.9268425342 & 4.2615349110 & 0.7405175034\\ 4.7615884152 & 7.8501924873 & 5.8494655809 & 6.9656592755 & 6.551971314 & 3.2529734117\\ 3.8785096512 & 5.8494655809 & 6.944092374 & 3.5575665839 & 6.4386031314 & 3.2511323776\\ 2.9268425342 & 6.9656592755 & 3.5575665839 & 8.0557274670 & 4.3524838521 & 2.5828497550\\ 4.2615349110 & 6.5519771314 & 6.438631314 & 4.3524838521 & 6.8647033270 & 3.4612275634\\ 0.7405175034 & 3.2529734117 & 3.2511323776 & 2.5828497550 & 3.4612275634 & 2.4107938586\end{pmatrix}$$

$$D_{\hat{b}\hat{b}}=\begin{pmatrix}0.2262487803 & -0.2081789014 & -0.1446332556\\ -0.2081789014 & 04924673105 & 0.2130609355\\ -0.1446332556 & 02130609355 & 0.2602306315\end{pmatrix}$$

$$D_{\hat{a}\hat{b}}=\begin{pmatrix}0.1570727438 & -1.3865400525 & -0.11323269598\\ -0.2724232268 & -1.1429777232 & -0.5911368275\\ 0.3883469099 & -1.4557706845 & -0.9955747836\\ -0.8698467808 & -0.2483236004 & -0.1154227406\\ 0.3023076141 & -1.4939503925 & -0.9922523355\\ 0.0681649499 & -0.4836315569 & -0.6689350383\end{pmatrix}$$

(2) giving the reliability probability value p=0.997 and dimension n=6 of the ambiguity, acquiring $\chi_{1-p}^2(6)$=19806; computing $$\chi^2_{(2)}(n)=\frac{1}{\pi\sqrt[n]{|D_{\hat{a}\hat{a}}|}}\left[3\Gamma\left(\frac{n}{2}+1\right)\right]^{\frac{2}{n}}=3.92$$

then acquiring the hyperellipsoid size for search:

$$\chi^2(n)=\max(\chi_{1-p}^2(n),\chi_{(2)}^2(n))=19.80465$$

and acquiring 9 6-dimensional integer vectors z by searching within the restriction of $\|\hat{a}-z_i\|_{D_{\hat{a}\hat{a}}}^2\le\chi^2(n)$, as shown in Table 1. Here, t=9.

TABLE 1

| Sequence | $z_i$ | $T_j$ | $P_i(\hat{a})$ |
|---|---|---|---|
| 1 | 112 104 121 108 122 112 | 0.314167380677157 | 0.841680320106421 |
| 2 | 116 112 124 118 126 114 | 0.027007829467721 | 0.072356202298198 |
| 3 | 109 103 119 109 120 112 | 0.026409479339390 | 0.070753172962484 |
| 4 | 119 113 126 117 128 114 | 0.003873696459373 | 0.010377952252372 |
| 5 | 115 105 123 107 124 112 | 0.001437667389506 | 0.003851629491253 |
| 6 | 118 117 132 119 134 119 | 0.000122530693910 | 0.000328269833267 |
| 7 | 114 109 129 109 130 117 | 0.000119811706495 | 0.000320985441767 |
| 8 | 113 111 122 119 124 114 | 0.000072435232337 | 0.000194059960677 |
| 9 | 110 99 113 107 114 107 | 0.000051289072077 | 0.000137407653559 |

(3) computing a posterior weighted probability with the 9 integer vectors being the true value of the ambiguity;

$$T_i=\exp\left(-\frac{1}{2}\|\hat{a}-z_i\|^2_{D_{\hat{a}\hat{a}}}\right)\quad i=1,2,L,t$$

$$P_i(\hat{a})=\frac{T_i}{\sum_{j=1}^{i}T_j}$$

and acquiring the computed results shown in Table 1.

(4) computing an integer solution for other unknown parameters b by using the posterior weighted probability; and $$\bar{b}_p=\hat{b}-D_{\hat{b}\hat{a}}D_{\hat{a}\hat{a}}^{-1}\left(\hat{a}-\sum_{i=1}^{t}P_i(\hat{a})z_i\right)$$

$$=(-496.663\quad 10167.492\quad -14650.306)^T$$

(5) computing a variance matrix $D_{\bar{b}_p\bar{b}_p}$ of the integer solution $\bar{b}_p$: using $$\frac{\partial P_i(\hat{a})}{\partial\hat{a}^T}=\frac{z_i^T\sum_{j=1}^{t}T_j-\sum_{j=1}^{t}T_jz_j^T}{\left[\sum_{j=1}^{t}T_j\right]^2}T_iD_{\hat{a}\hat{a}}^{-1}$$

to acquire the corresponding computed result:

$$\frac{\partial P_i(\hat{a})}{\partial\hat{a}^T}\Big|_{i=1}=(1.7755439015\quad -2.2695977158\quad -8.0577409889\quad 0.0517902046\quad 6.8116373134\quad 3.6003646778)$$

$$\frac{\partial P_i(\hat{a})}{\partial\hat{a}^T}\Big|_{i=2}=(-1.2010591330\quad -0.3841116800\quad 3.9745420053\quad 0.9731903367\quad -1.5924312068\quad -3.1741454932)$$

$$\frac{\partial P_i(\hat{a})}{\partial\hat{a}^T}\Big|_{i=3}=(-0.5387715195\quad 3.4149888812\quad 4.5655136157\quad -1.3140054108\quad -6.3741063979\quad -0.0451463375)$$

$$\frac{\partial P_i(\hat{a})}{\partial\hat{a}^T}\Big|_{i=4}=(-0.0713476908\quad -0.5839814749\quad -0.1989506758\quad 0.3316808251\quad 0.7905303390\quad -0.4042487682)$$

$$\frac{\partial P_i(\hat{a})}{\partial\hat{a}^T}\Big|_{i=5}=(0.0455796034\quad -0.2066755322\quad -0.3222817490\quad 0.0710572408\quad 0.4093324737\quad 0.0354090520)$$

$$\frac{\partial P_i(\hat{a})}{\partial\hat{a}^T}\Big|_{i=6}=(-0.0056765603\quad 0.0133267213\quad 0.0181823270\quad -0.0042671670\quad -0.0188479880\quad -0.0081964766)$$

$$\frac{\partial P_i(\hat{a})}{\partial\hat{a}^T}\Big|_{i=7}=(0.0004546497\quad 0.0138694484\quad -0.0029258654\quad -0.0085094799\quad -0.0087677242\quad 0.0074395440)$$

$$\frac{\partial P_i(\hat{a})}{\partial\hat{a}^T}\Big|_{i=8}=(-0.0051083534\quad 0.0088596360\quad 0.0250397412\quad -0.0009819740\quad -0.0233241558\quad -0.0094670211)$$

$$\frac{\partial P_i(\hat{a})}{\partial\hat{a}^T}\Big|_{i=9}=(0.0003851024\quad -0.0066782840\quad -0.0013784100\quad 0.0036258337\quad 0.0059773466\quad -0.0020091770)$$

and computing $$K = -D_{\hat{b}\hat{a}}D_{\hat{a}\hat{a}}^{-1}\left(E - \sum_{i=1}^{t} z_i \frac{\partial P_i(\hat{a})}{\partial \hat{a}^T}\right) = \begin{pmatrix} 1.934746 & -0.937101 & -7.922566 & -0.642889 & 5.151040 & 4.544514 \\ -0.328698 & 4.303042 & 5.000380 & -1.932506 & -7.412875 & 0.444210 \\ -0.649870 & 0.614295 & 2.516321 & -0.033225 & -1.840195 & -1.053978 \end{pmatrix}$$

then obtaining $$D_{\bar{b}_p\bar{b}_p} = KD_{\hat{a}\hat{a}}K^T + D_{\hat{b}\hat{a}}K^T + KD_{\hat{a}\hat{b}} + D_{\hat{b}\hat{b}} = \begin{pmatrix} 0.157508 & -0.010105 & -0.039551 \\ -0.010105 & 0.051018 & 0.007560 \\ -0.039551 & 0.007560 & 0.010525 \end{pmatrix}$$

Step 2. outputting a computed result of the processor by an output unit of the data computing platform.

The basic principles, main features and advantages of the present disclosure have been shown and described above. It should be understood by a person skilled in the art that the present disclosure is not limited to the embodiments set forth herein. The embodiments and specification herein are only for purposes of illustrating the principle of the present disclosure, various changes and improvements can be made to the present disclosure without departing from the spirit and scope of the present disclosure, and the changes and improvements will fall into the protection scope of the present disclosure. The protection scope set forth in the present disclosure is defined by the appended claims and equivalents thereof.

What is claimed is:

1. A method for quickly acquiring a highly reliable integer solution for satellite positioning, wherein estimates and a variance matrix of satellite positioning parameters under a constraint of an integer property of an ambiguity are obtained by synthesizing a plurality of integer vectors with a same dimension as the ambiguity according to a probability, wherein the method comprises following steps:

step 1. acquiring observation data by an input unit of a data computing platform from a GNSS receiver, and sending the observation data to a processor of the data computing platform for solving, and executing following steps by the processor:

(1) establishing a GNSS carrier observation equation, solving a real solution $\hat{a}$ for ambiguity a and a variance matrix $D_{\hat{a}\hat{a}}$, a real solution $\hat{b}$ for other unknown parameters b including positioning parameters and a corresponding variance matrix $D_{\hat{b}\hat{b}}$, and a covariance matrix $D_{\hat{a}\hat{b}}$ of the real solutions $\hat{a}$ and $\hat{b}$ by using a least squares method;

(2) determining t integer vectors with the same dimension as the ambiguity according to a given reliability probability p;

(3) computing a posterior weighted probability $P_i(\hat{a})$ with the t integer vectors being a true value of the ambiguity;

(4) computing an integer solution $\bar{b}_p$ for the other unknown parameters b by using the posterior weighted probability $P_i(\hat{a})$; and (5) computing a variance matrix $D_{\bar{b}_p\bar{b}_p}$ of the integer solution $\bar{b}_p$; and step 2. outputting a computed result of the processor by an output unit of the data computing platform.

2. The method for quickly acquiring the highly reliable integer solution for satellite positioning according to claim 1, wherein the given reliability probability p in the step 1 is given based on reliability requirements for positioning results, wherein $0.95 \le p < 1$.

3. The method for quickly acquiring the highly reliable integer solution for satellite positioning according to claim 1, wherein the method for determining t integer vectors with the same dimension as the ambiguity in the step 1 comprises following steps:

(1) computing a chi-square value $\chi_{1-p}^2(n)$ according to an ambiguity dimension n and the reliability probability p;

(2) computing a hyperellipsoid radius comprising at least two integer vectors by a formula (1) according to the ambiguity dimension n $$\chi_{(2)}^2(n) = \frac{1}{\pi\sqrt[n]{|D_{\hat{a}\hat{a}}|}}\left[3\Gamma\left(\frac{n}{2}+1\right)\right]^{\frac{2}{n}} \tag{1}$$

in the formula (1), || is a determinant compute sign and Γ(g) is a gamma function;

(3) determining a hyperellipsoid size for search by a formula (2):

$$\chi^2(n) = \max(\chi_{1-p}^2(n), \chi_{(2)}^2(n)) \tag{2};$$

and (4) acquiring t n-dimensional integer vectors $z_t$ by searching and comparing within a restriction of $\|\hat{a}-z_i\|_{D_{\hat{a}\hat{a}}}^2 \le \chi^2(n)$, i=1, 2, L, t.

4. The method for quickly acquiring the highly reliable integer solution for satellite positioning according to claim 1, wherein the computing the posterior weighted probability $P_i(\hat{a})$ with the t integer vectors being the true value of the ambiguity in the step 1 is obtained by formulas (3) and (4):

$$T_i = \exp\left(-\frac{1}{2}\|\hat{a}-z_i\|_{D_{\hat{a}\hat{a}}}^2\right) \quad i = 1, 2, L, t \tag{3}$$

$$P_i(\hat{a}) = \frac{T_i}{\sum_{j=1}^{t} T_j}. \tag{4}$$

5. The method for quickly acquiring the highly reliable integer solution for satellite positioning according to claim 1, wherein the computing the variance matrix $D_{\bar{b}_p\bar{b}_p}$ of the integer solution $\bar{b}_p$ in the step 1 is obtained by formulas (5), (6) and (7):

$$\frac{\partial P_i(\hat{a})}{\partial \hat{a}^T} = \frac{z_i^T \sum_{j=1}^{t} T_j - \sum_{j=1}^{t} T_j z_j^T}{\left[\sum_{j=1}^{t} T_j\right]^2} T_i D_{\hat{a}\hat{a}}^{-1} \quad j = 1, 2, L, t \tag{5}$$

$$K = -D_{\hat{b}\hat{a}} D_{\hat{a}\hat{a}}^{-1} \left( E - \sum_{i=1}^{t} z_i \frac{\partial P_i(\hat{a})}{\partial \hat{a}^T} \right) \tag{6}$$

$$D_{\bar{b}_p \bar{b}_p} = K D_{\hat{a}\hat{a}} K^T + D_{\hat{b}\hat{a}} K^T + K D_{\hat{a}\hat{b}} + D_{\hat{b}\hat{b}} \tag{7}$$

wherein, $D_{\hat{b}\hat{a}} = D_{\hat{a}\hat{b}}^T$.

* * * * *